(12) United States Patent
Monnet

(10) Patent No.: US 6,793,595 B1
(45) Date of Patent: Sep. 21, 2004

(54) CORD FASTENER FOR SPORTS NETS

(76) Inventor: Michael James Monnet, 6996 S. Cook Way, Centennial, CO (US) 80122

( * ) Notice: Subject to any disclaimer, the term of this patent is extended or adjusted under 35 U.S.C. 154(b) by 0 days.

(21) Appl. No.: 10/653,331

(22) Filed: Sep. 2, 2003

(51) Int. Cl.[7] ............................................. A63B 63/00
(52) U.S. Cl. ...................................... 473/478; 473/489
(58) Field of Search ........................ 473/478, 415–416, 473/476, 451, 435, 489; 273/400; 24/117 R, 17 AP, 17 B, 129 R

(56) References Cited

U.S. PATENT DOCUMENTS

| | | | |
|---|---|---|---|
| 483,771 A | | 10/1892 | Seymour |
| 630,837 A | | 8/1899 | Anderson et al. |
| 666,400 A | * | 1/1901 | Tregoning ................ 24/129 R |
| 749,235 A | | 1/1904 | Smith et al. |
| 959,076 A | | 5/1910 | Scanlon |
| 986,014 A | | 3/1911 | Krenzke |
| 1,426,945 A | | 8/1922 | Anderson |
| 2,418,885 A | * | 4/1947 | Houston .................... 24/129 B |
| 3,427,026 A | * | 2/1969 | Mahoney ..................... 473/435 |
| 3,981,500 A | | 9/1976 | Ryan |
| 4,414,712 A | | 11/1983 | Beggins |
| 4,640,212 A | | 2/1987 | Brandt |
| 4,939,820 A | * | 7/1990 | Babcock .................... 24/129 R |
| 4,976,013 A | * | 12/1990 | Wax .......................... 24/129 R |
| 5,094,448 A | | 3/1992 | Hackett |
| 5,476,266 A | * | 12/1995 | Caruso ....................... 473/478 |
| 5,715,578 A | * | 2/1998 | Knudson ................... 24/16 PB |
| 5,987,707 A | * | 11/1999 | DeShon ..................... 24/17 AP |
| 6,113,507 A | | 9/2000 | Padilla |
| 6,383,096 B1 | * | 5/2002 | Green ......................... 473/415 |

* cited by examiner

*Primary Examiner*—Stephen P. Garbe
*Assistant Examiner*—M. Chambers
(74) *Attorney, Agent, or Firm*—Dorr, Carson, Sloan, Birney & Kramer, P.C.

(57) ABSTRACT

An apparatus for removably securing a sports net to a supporting frame includes a flexible cord that can be wrapped around the supporting frame and through the sports net. The device also includes a fastener with a central portion attached at a central section of the cord and at least one wing extending from the central portion of the fastener. After the cord has been wrapped around the supporting frame and through the sports net, it can be removably secured by wrapping the cord around the fastener so that the cord is held between the fastener wing(s) and the central section of the cord.

17 Claims, 5 Drawing Sheets

Fig. 6
Fig. 7
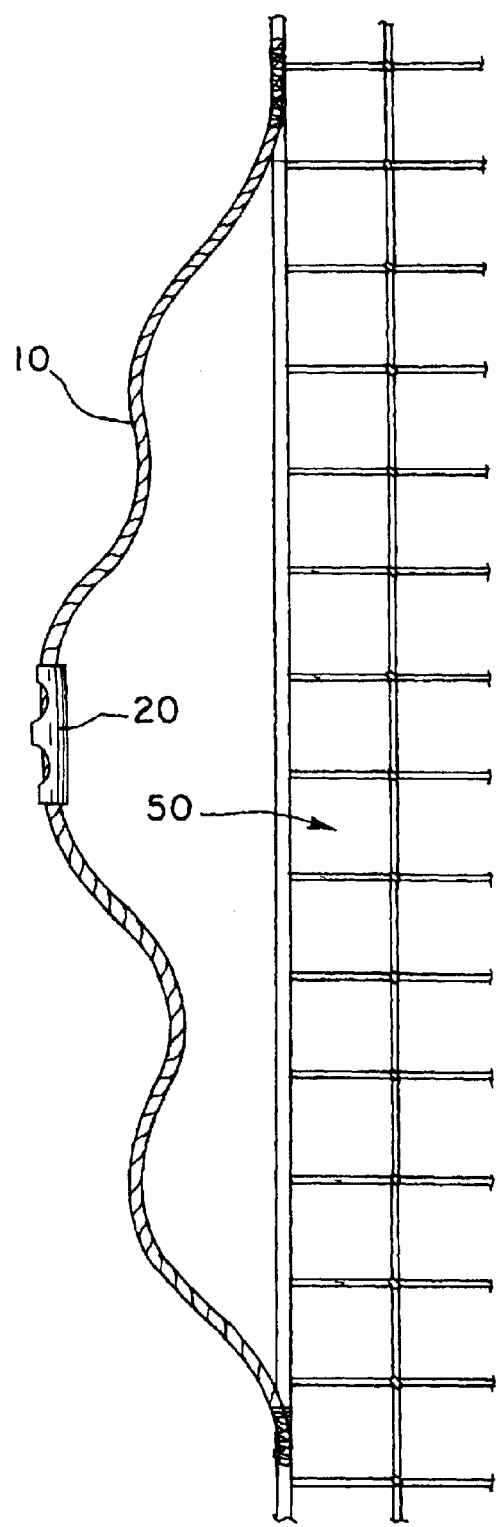
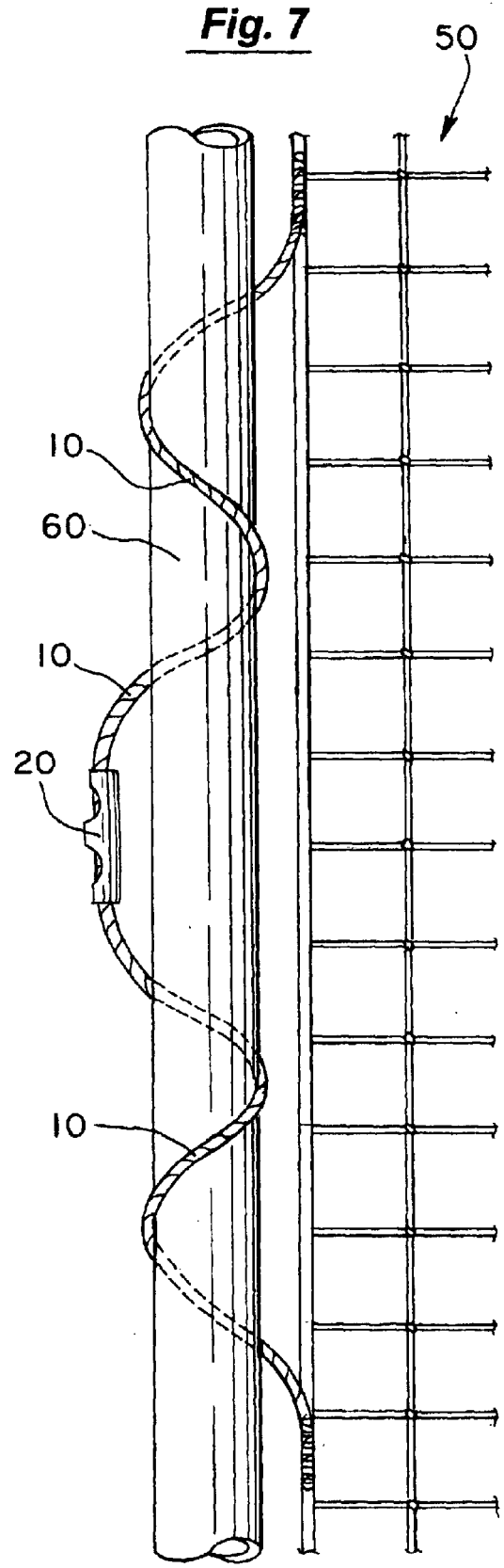

CORD FASTENER FOR SPORTS NETS

BACKGROUND OF THE INVENTION

1. Field of the Invention

The present invention relates generally to the field of fasteners for attaching a sports net to a support frame. More specifically, the present invention discloses a cord fastener for removably securing a sports net to a support frame.

2. Statement of the Problem

Many sports nets for soccer, lacrosse, field hockey and the like, use a support frame that is permanently attached to the playing field. For example, support frames are typically made of wood posts or metal tubing. The base ends of the frame are usually permanently buried in the ground or embedded in concrete in the ground.

In many cases, the sports net is not permanently attached to its support frame, but rather is only temporarily attached to the support frame for the duration of a sports season or perhaps for only a weekend or a single game. This reduces weathering and the risk of vandalism. However, this approach requires extra time and effort to attach and detach the sports net. Therefore, a need exists for a device to simplify and expedite the process of attaching and detaching a sports net to its supporting frame.

3. Prior Art

The prior art in this field includes the following:

| Inventor | Patent No. | Issue Date |
| --- | --- | --- |
| Seymour | 483,771 | Oct. 4, 1892 |
| Anderson et al. | 630,837 | Aug. 15, 1899 |
| Smith | 749,235 | Jan. 12, 1904 |
| Scanlon | 959,076 | May 24, 1910 |
| Krenzke | 986,014 | Mar. 7, 1911 |
| Anderson | 1,426,945 | Aug. 22, 1922 |
| Houston | 2,418,885 | Apr. 15, 1947 |
| Ryan | 3,981,500 | Sep. 21, 1976 |
| Beggins | 4,414,712 | Nov. 15, 1983 |
| Wax | 4,976,013 | Dec. 11, 1990 |
| Brandt | 4,640,212 | Feb. 3, 1987 |
| Hackett | 5,094,448 | Mar. 10, 1992 |
| DeShon | 5,987,707 | Nov. 23, 1999 |
| Padilla | 6,113,507 | Sep. 5, 2000 |

DeShon discloses a bungee cord shortening device consisting or a T-shaped housing with three legs. The third leg has two opposite cord-retaining grooves for holding a loop of the bungee cord.

Seymour discloses a cylindrical wiring insulator having a passageway with lugs to hold a wire.

Anderson et al. disclose a rope clamp.

Smith discloses a fastener for securing the ends of a clothes line to form a loop.

Scanlon discloses a hanger for suspending a trolley wire to provide power to trolley cars traveling on a track below.

Krenzke, Anderson, Houston, Beggins and Wax disclose other examples of rope fastening devices.

Ryan discloses a flexible support rod with a longitudinal channel for receiving a rope. A locking cleat on the support rod is used to secure one end of the rope.

Brandt discloses a mooring device with an elastomeric rope.

Hackett discloses a jumping apparatus using series of bungee cords.

Padilla discloses a sports net adapted to be quickly attached to and detached from a sports goal frame. An elastic cord is incorporated in the outer perimeter of the sports net and constricts the perimeter of the net so that it can be tucked around the frame.

4. Solution to the Problem

None of the prior art references discussed above show a flexible cord with a fastener attached to the central portion of the cord that can be used to removably secure a sports net to a support frame.

SUMMARY OF THE INVENTION

This invention provides an apparatus for removably securing a sports net to a supporting frame. The apparatus includes a flexible cord that can be wrapped around the supporting frame and through the sports net. The device also includes a fastener with a central portion attached at a central section of the cord and at least one wing extending from the central portion of the fastener. After the cord has been wrapped around the supporting frame and through the sports net, it can be removably secured by wrapping the cord around the fastener so that the cord is held between the fastener wing(s) and the central section of the cord.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 6 is a front view of a second embodiment of the present invention in which the ends of the cord 10 have been permanently attached to the edge of a sports net 50.

FIG. 7 is a front view of the second embodiment of the present invention partially wrapped around the support frame 60.

DETAILED DESCRIPTION OF THE INVENTION

Figure 1:
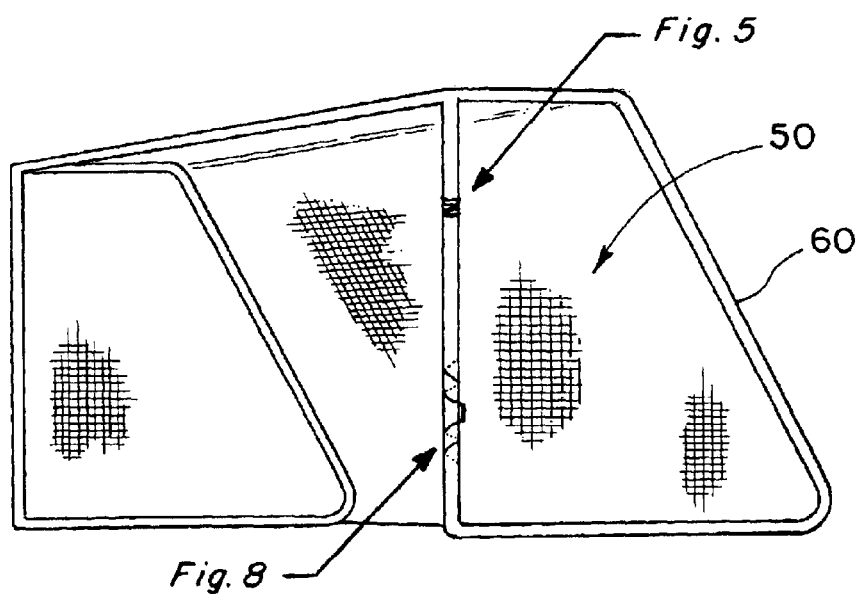
FIG. 1 is a front view of a sports net 50 attached to a support frame 60 by means of the present invention.

Turning to FIG. 1, a front perspective is provided showing a sports net 50 attached to a support frame 60 by means of the present invention. Two embodiments are shown in this figure. The first embodiment is shown in greater detail in FIGS. 2–5 and results in an attachment as depicted on the upper portion of the support frame on FIG. 1. In contrast, the second embodiment is shown in greater detail in FIGS. 6–8 and results in an attachment as illustrated on the lower portion of the support frame in FIG. 1.

Figure 2:
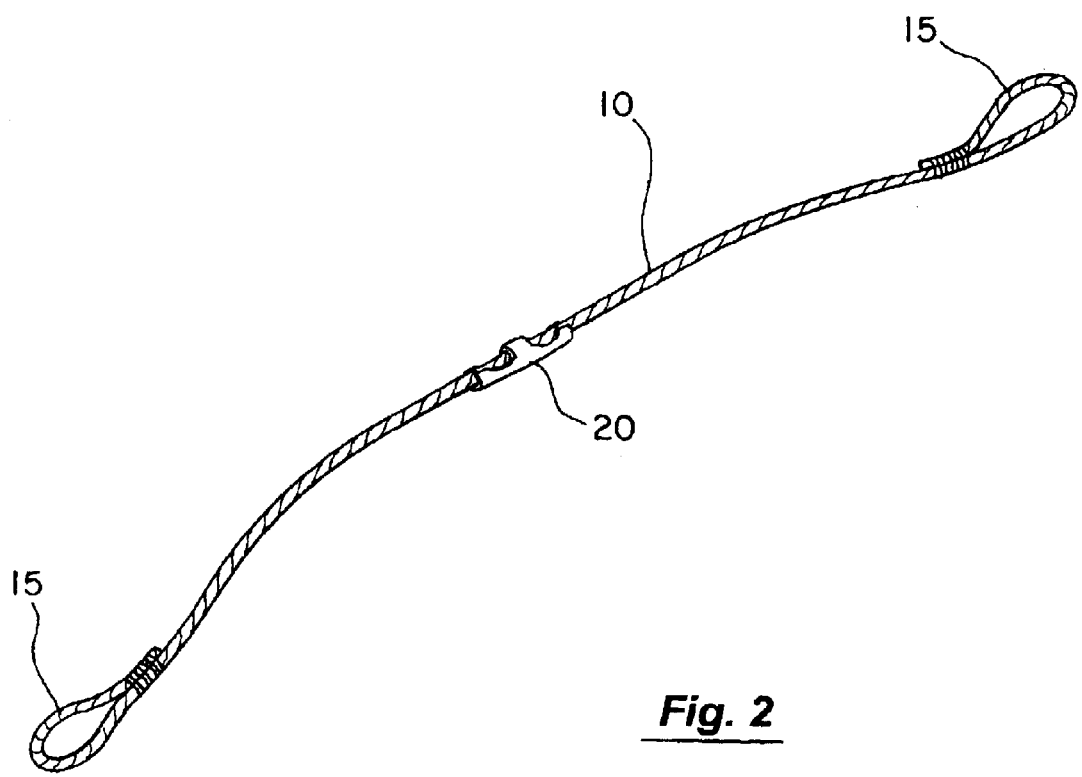
FIG. 2 is a front view of a first embodiment of the present invention in which the cord 10 has loops 15 at both ends.

FIG. 2 illustrates the first embodiment of the present invention in which the cord 10 has loops 15 at both ends. The cord 10 can be made of a flexible material, such as conventional rope. Optionally, the cord can be made an elastic material that allows axial elongation of the cord (e.g., bungee cord). This enables the cord 10 to stretch to accommodate a range of support frame diameters and sizes. The loops 15 can be formed, for example, by stitching the ends of the cord back on themselves as shown in FIG. 2. The loops could also be formed, for example, by attaching separate circular members to the ends of the cord 10.

Figure 3:
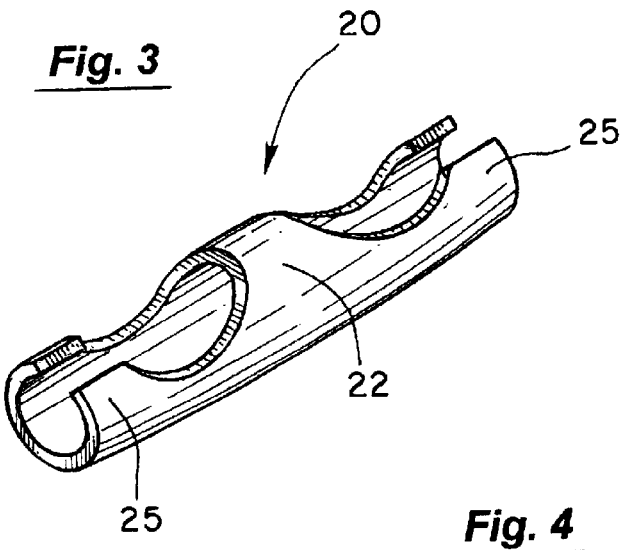
FIG. 3 is a front perspective view of the fastener 20.

A fastener 20 is attached to the central section of the cord 10, as shown in FIG. 2. FIG. 3 provides a front perspective view the fastener 20. In the preferred embodiment, the central portion 22 of the fastener 20 has dimensions selected to securely grip the cord 10 at a desired location along the general mid-section of the cord 10. For example, central portion 22 of the fastener 20 can be generally tubular with an inside diameter slightly smaller than the outside diameter of the cord 10. The central portion 22 of the fastener 20 could also be crimped or bonded by adhesive to the cord 10. Alternatively, the diameter of the central portion 22 of the fastener 20 could be selected to allow the fastener 20 to slide along the cord 10. The central portion 22 of the fastener 20 could also provide a frictional fit around the cord 10 that requires some degree of axial force to move the fastener 20 along the cord 10. If desired, multiple fasteners can be attached at intervals along the length of a cord.

Figure 4:
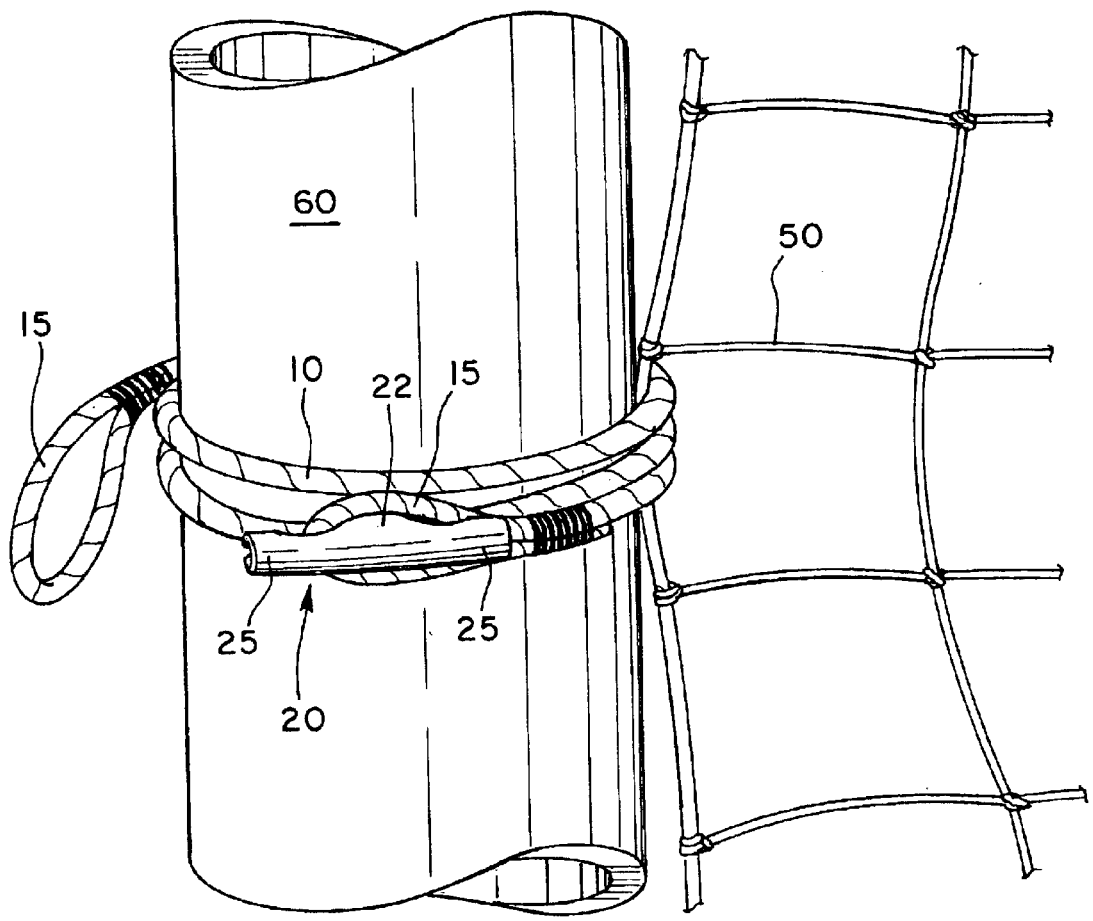
FIG. 4 is a front view of the present invention being wrapped around a support frame 60 and through the sports net 50, with one loop 15 secured to the fastener 20.
Figure 5:
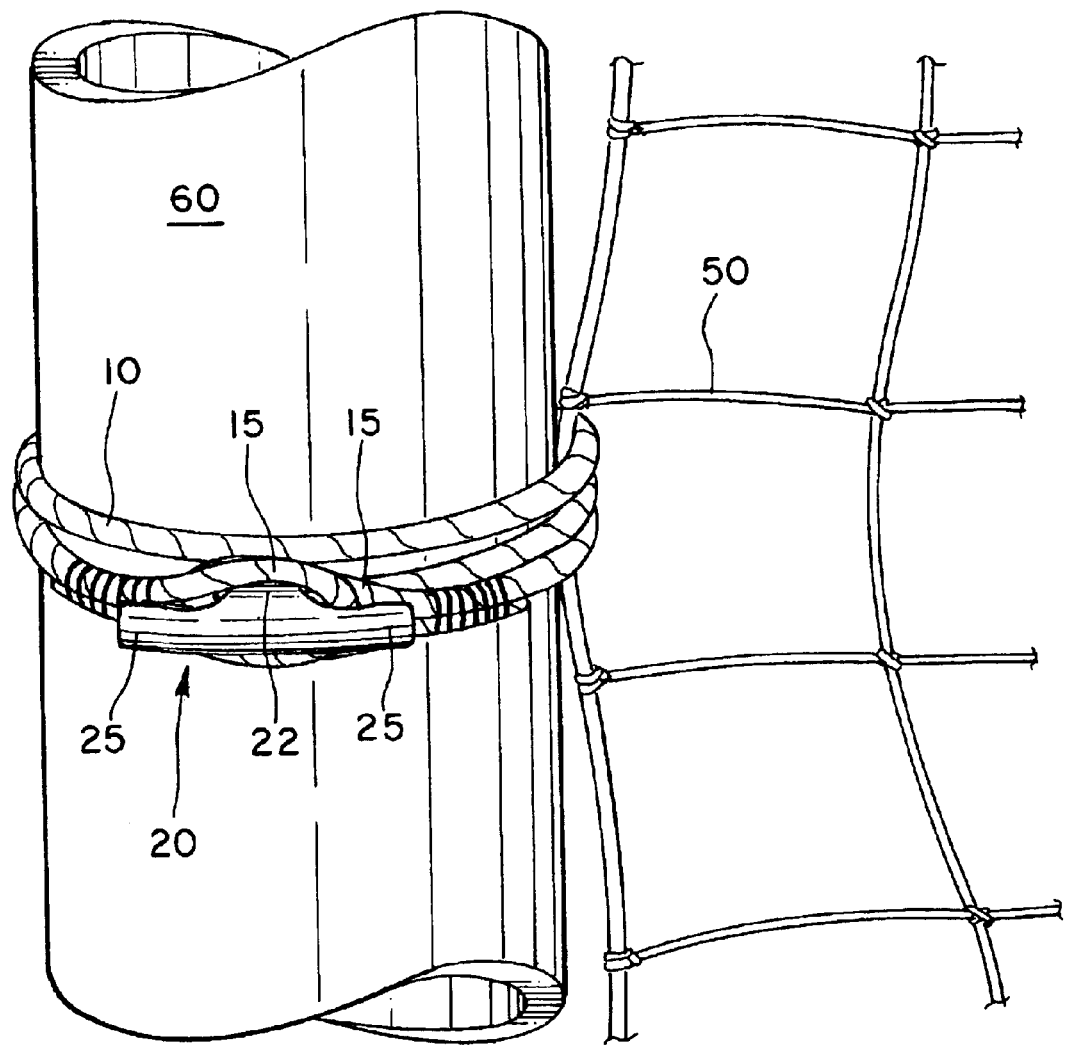
FIG. 5 is a front view of the present invention corresponding to FIG. 4 after the second loop 15 has been secured to the fastener 20.

At least one wing 25 extends from the central portion 22 of the fastener. In the preferred embodiment, two wings 25 extend from opposing sides of the central portion 22, as illustrated in FIG. 3. The wings can be generally contoured to match the cross-sectional curvature of the cord 10, as shown in FIG. 3. This results in a trimmer appearance and reduces the risk of tangling while the cord is being wrapped around the support frame 60. Each wing 25 includes a longitudinal slot having a width large enough to accommodate the cord 10. Optionally, the underside of each wing 25 bears a notch or recess to help retain the cord between the wing 25 and the central section of the cord 10 after the device has been wound around the support frame 60, as shown in FIGS. 4 and 5.

In use, the cord 10 is first wrapped around the support frame 60 and through the sports net 50. One loop 15 is then secured to the fastener 20, as shown in FIG. 4. In particular, the loop 15 is wedged between one of the fastener wings 25 and the underlying portion of the cord 10. If there is a sufficient length of remaining cord, the second loop is then wrapped around the support frame 60 and through the sports net 50. Finally, the second loop 15 secured to the fastener 20 as shown in FIG. 5 by wedging it between the other fastener wing 25 and the underlying portion of the cord 10. This entire process can be completed with minimal effort in a few seconds. Several cord/fastener assemblies are typically spaced along the periphery of a sports net, depending on its size and shape. For example, turning to FIG. 1, several cord/fastener assemblies may be necessary to properly attach the net 50 to the front horizontal cross-piece of the support frame 60. In contrast, one or two cord/fastener assemblies may be sufficient to attach the net to the vertical members of the support frame 60.

Figures 8, 9:
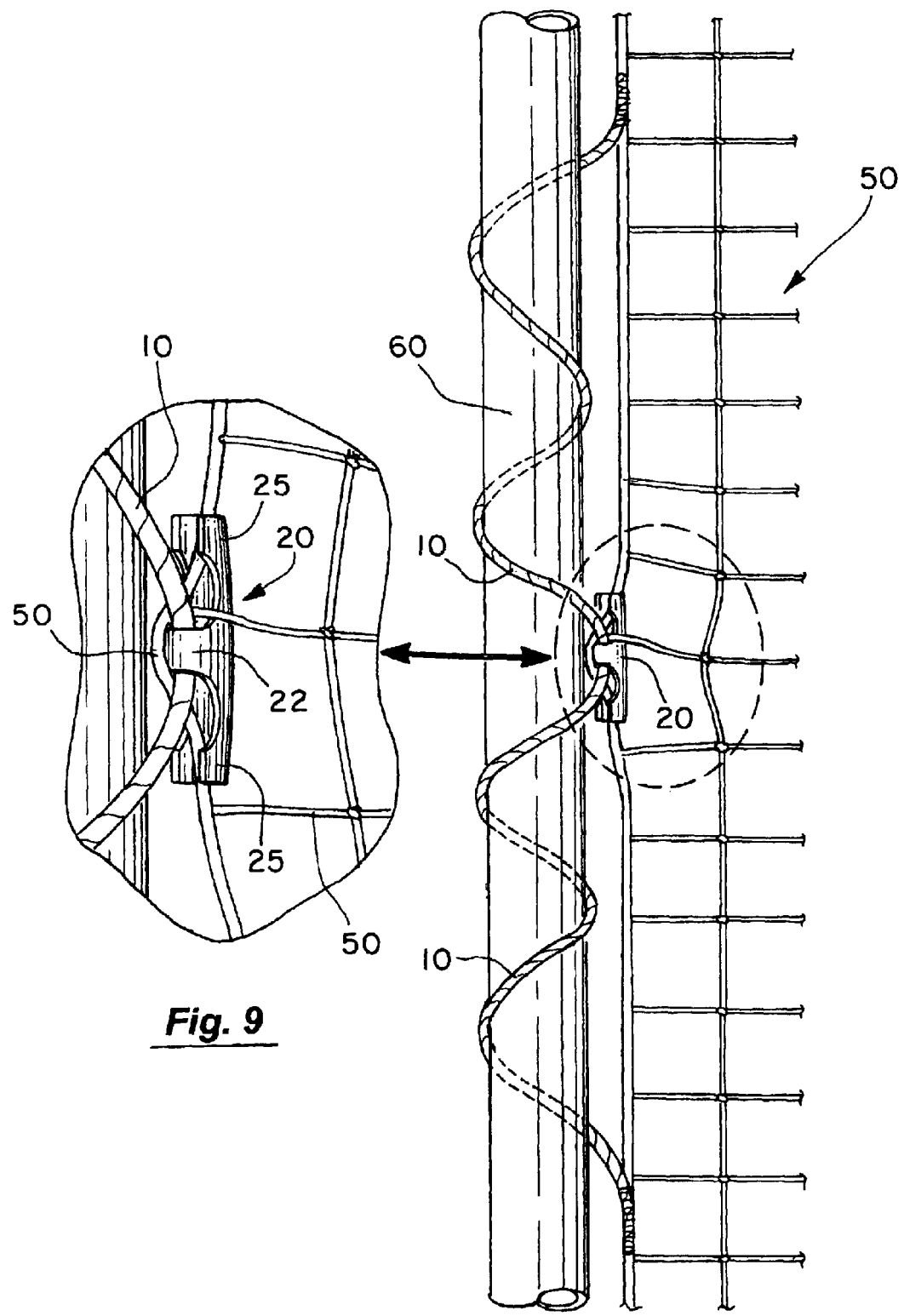
FIG. 8 is a front view of the second embodiment corresponding to FIG. 7 after the perimeter of the sports net 50 has been secured to the fastener 20.
FIG. 9 is a detail front view of the fastener 20 from FIG. 8.

FIGS. 6–8 illustrate a second embodiment of the present invention in which the ends of the cord 10 are permanently attached to the perimeter of the net 50. FIG. 6 shows the edge of a net 50 with the ends of the cord 10 permanently attached. This embodiment essentially makes the cord/fastener assemblies permanent parts of the net, and thereby reduces the risk that the cord/fastener assemblies might become lost or misplaced. This embodiment also allows a sports net manufacturer to install cord/fastener assemblies at optimal locations along the perimeter of the net at the factory.

In the second embodiment, the mid-section of the cord 10 is wrapped around the support frame 60 as shown in FIG. 7. The fastener 20 is then secured to the edge of the net 50 as shown in FIGS. 8 and 9. In particular, the edge of the net 50 can be wedged between the wings 25 of the fastener and the cord 10. Alternatively, the fastener 20 can be wrapped through the net 50 and then secured to a section of the cord 10.

The cord 10 in the embodiment shown in FIG. 8 is sufficiently long to allow the cord 10 to be wrapped several times around the support frame 60 before the fastener 20 is secured. However, other cord lengths could be used. The length of the cord 10 provides a means for controlling the spacing between the points of attachment connecting the net 50 and the support frame 60. For example, a shorter cord can be used that is only wrapped once around the support frame 60 before the fastener 20 is secured. This would result in a relatively short spacing between the points of attachment to the net 50. As a trade-off, it might be necessary to employ a greater number of cord/fastener assemblies at intervals around the perimeter of the net opening.

It should be understood that other embodiments of the present invention are possible. For example, any of a wide variety of shapes and configurations of the fastener 20 could be employed. The embodiment of the fastener 20 shown in the drawings has two opposing wings 25, but one wing would be sufficient. The fastener could also be equipped with three or more wings to provide more options to securing the net. The shape of the wings is also largely a matter of design choice.

A third, hybrid embodiment is also possible having a cord with one end secured to the net and a loop at the other end of the cord. The fastener is attached at the mid-section of the cord, as before. The looped end of the cord is wrapped around the support frame and through the net. The loop is then secured to the fastener, as previously describe with regard to the first embodiment.

The above disclosure sets forth a number of embodiments of the present invention. Other arrangements or embodiments, not precisely set forth, could be practiced under the teachings of the present invention and as set forth in the following claims.

I claim:

1. An apparatus for removably securing a sports net to a supporting frame, said apparatus comprising:
   a flexible cord to removably secure a sports net to a supporting frame by wrapping the cord around a supporting frame and through a sports net; and
   a fastener having:
      (a) a central portion attached at a central section of the cord; and
      (b) at least one wing extending from the central portion of the fastener adjacent to the central section of the cord, said wing removably securing the cord after it has been wrapped around a supporting frame and through a sports nets.

2. The apparatus of claim 1 wherein the cord further comprises opposing ends attached to the perimeter of a sports net.

3. The apparatus of claim 1 wherein the cord further comprises at least one loop at an end of the cord that is removably secured by the fastener.

4. The apparatus of claim 1 wherein the cord is elastic.

5. The apparatus of claim 1 wherein the fastener comprises a substantially tubular central portion secured at a central location on the cord, and opposing wings extending from the central portion.

6. The apparatus of claim 1 wherein the wing has a curved cross-section to substantially match the radius of the cord.

7. The apparatus of claim 1 wherein the wing further comprises a notch to retain the cord between the wing and the central section of the cord.

8. An apparatus for removably securing a sports net to a supporting frame, said apparatus comprising:
- a flexible cord to removably secure a sports net to a supporting frame by wrapping the cord around a supporting frame and through a sports net, said cord having loops at both ends of the cord; and
- a fastener having:
  - (a) a central portion attached at a central section of the cord; and
  - (b) at least one wing extending from the central portion of the fastener adjacent to the central section of the cord, said wing removably securing the loops of the cord about the fastener after the cord has been wrapped around a supporting frame and through a sports nets by holding the loops between the wing and the central section of the cord.

9. The apparatus of claim 8 wherein the cord is elastic.

10. The apparatus of claim 8 wherein the fastener comprises a substantially tubular central portion secured at a central location on the cord, and opposing wings extending from the central portion.

11. The apparatus of claim 8 wherein the wing has a curved cross-section to substantially match the radius of the cord.

12. The apparatus of claim 8 wherein at least one wing further comprises a notch to retain the cord between the wing and the central section of the cord.

13. A sports net assembly for removable attachment to a supporting frame, said sports net assembly comprising:
- a sports net having a perimeter;
- a flexible cord having ends secured to the sports net; and
- a fastener having:
  - (a) a central portion attached at a central section of the cord; and
  - (b) at least one wing extending from the central portion of the fastener adjacent to the central section of the cord, said wing removably securing the cord after it has been wrapped around a supporting frame by holding the sports net between the wing and the central section of the cord.

14. The sports net assembly of claim 13 wherein the cord is elastic.

15. The sports net assembly of claim 13 wherein the fastener comprises a substantially tubular central portion secured at a central location on the cord, and opposing wings extending from the central portion.

16. The sports net assembly of claim 13 wherein the wing has a curved cross-section to substantially match the radius of the cord.

17. The sports net assembly of claim 13 wherein at least one wing further comprises a notch to retain the perimeter of the sports net between the wing and the central section of the cord.

* * * * *